(12) United States Patent
Andre et al.

(10) Patent No.: US 12,568,078 B2
(45) Date of Patent: Mar. 3, 2026

(54) AUTOMATICALLY DETERMINING AUTHENTICATED ONLINE STATUSES OF EDGE DEVICES

(71) Applicant: Dell Products L.P., Round Rock, TX (US)

(72) Inventors: Emmanuel Andre, Singapore (SG); Chuan Tian Chuah, Singapore (SG)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 18/123,454

(22) Filed: Mar. 20, 2023

(65) Prior Publication Data

US 2024/0323180 A1 Sep. 26, 2024

(51) Int. Cl.
*H04L 9/40* (2022.01)

(52) U.S. Cl.
CPC ...... *H04L 63/0853* (2013.01); *H04L 63/0435* (2013.01)

(58) Field of Classification Search
CPC ........................ H04L 63/0853; H04L 63/0435
See application file for complete search history.

(56) References Cited

U.S. PATENT DOCUMENTS 11,050,781 B2 6/2021 Samuel et al.
11,425,111 B2 8/2022 Smith et al.

| | | | | |
|---|---|---|---|---|
| 2005/0273521 | A1* | 12/2005 | Patrick ................... | H04L 67/14 |
| | | | | 709/225 |
| 2013/0268764 | A1* | 10/2013 | Valdes .................. | H04L 63/126 |
| | | | | 713/178 |
| 2016/0254942 | A1* | 9/2016 | de Luna .............. | H04L 67/1097 |
| | | | | 709/212 |
| 2017/0331821 | A1* | 11/2017 | Filippidis ............ | H04L 63/0876 |
| 2018/0262533 | A1* | 9/2018 | McCaig .............. | H04W 12/122 |
| 2019/0121962 | A1* | 4/2019 | Coleman .............. | H04L 63/083 |
| 2020/0177704 | A1* | 6/2020 | Nucci ..................... | H04L 67/34 |
| 2020/0288308 | A1* | 9/2020 | Jimenez .............. | H04W 12/068 |
| 2020/0374700 | A1 | 11/2020 | Smith et al. | |
| 2021/0111889 | A1* | 4/2021 | Higley .................. | H04L 9/0643 |
| 2022/0150228 | A1* | 5/2022 | Speak ................... | H04L 63/083 |
| 2022/0414039 | A1* | 12/2022 | Kamakura .............. | G06F 13/36 |
| 2023/0071504 | A1* | 3/2023 | Wright ................ | G06F 11/3696 |

(Continued)

*Primary Examiner* — Catherine Thiaw
*Assistant Examiner* — Nega Woldemariam
(74) *Attorney, Agent, or Firm* — Ryan, Mason & Lewis, LLP

(57) ABSTRACT

Methods, apparatus, and processor-readable storage media for automatically determining authenticated online statuses of edge devices are provided herein. An example computer-implemented method includes authenticating at least one connection of at least one edge device to at least one event bus by processing at least one event communication signed by the at least one edge device; storing the at least one signed event communication in at least one database; requesting online status of the at least one edge device by querying one or more APIs associated with the at least one event bus in accordance with one or more temporal parameters; comparing one or more responses from the one or more APIs associated with the at least one event bus with at least a portion of the at least one signed event communication stored in the at least one database; and performing automated actions based on the comparing.

20 Claims, 6 Drawing Sheets

(56)                  References Cited

U.S. PATENT DOCUMENTS

| | | | |
|---|---|---|---|
| 2023/0216947 A1* | 7/2023 | Bernardi | H04L 67/10 |
| | | | 713/150 |
| 2023/0252382 A1* | 8/2023 | Simpson | G06Q 50/02 |
| | | | 701/410 |
| 2024/0323180 A1* | 9/2024 | Andre | H04L 63/0853 |

* cited by examiner

*FIG.  4*

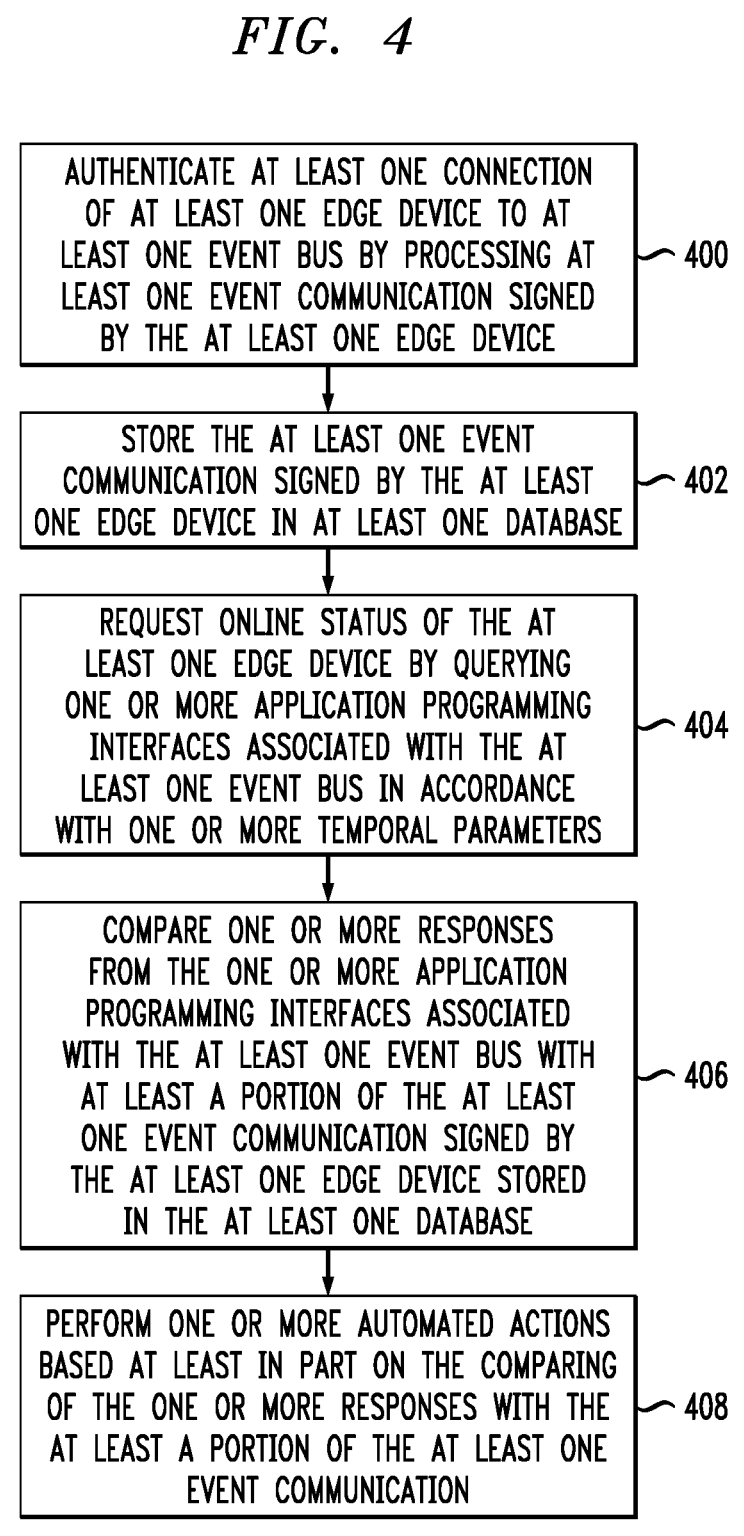

```
┌─────────────────────────────────────┐
│   AUTHENTICATE AT LEAST ONE CONNECTION │
│   OF AT LEAST ONE EDGE DEVICE TO AT    │
│   LEAST ONE EVENT BUS BY PROCESSING AT │─── 400
│   LEAST ONE EVENT COMMUNICATION SIGNED │
│      BY THE AT LEAST ONE EDGE DEVICE   │
└─────────────────────────────────────┘
                  │
                  ▼
┌─────────────────────────────────────┐
│       STORE THE AT LEAST ONE EVENT     │
│   COMMUNICATION SIGNED BY THE AT LEAST │─── 402
│   ONE EDGE DEVICE IN AT LEAST ONE DATABASE │
└─────────────────────────────────────┘
                  │
                  ▼
┌─────────────────────────────────────┐
│     REQUEST ONLINE STATUS OF THE AT    │
│    LEAST ONE EDGE DEVICE BY QUERYING   │
│   ONE OR MORE APPLICATION PROGRAMMING  │
│   INTERFACES ASSOCIATED WITH THE AT    │─── 404
│    LEAST ONE EVENT BUS IN ACCORDANCE   │
│   WITH ONE OR MORE TEMPORAL PARAMETERS │
└─────────────────────────────────────┘
                  │
                  ▼
┌─────────────────────────────────────┐
│      COMPARE ONE OR MORE RESPONSES     │
│     FROM THE ONE OR MORE APPLICATION   │
│    PROGRAMMING INTERFACES ASSOCIATED   │
│   WITH THE AT LEAST ONE EVENT BUS WITH │
│    AT LEAST A PORTION OF THE AT LEAST  │─── 406
│     ONE EVENT COMMUNICATION SIGNED BY  │
│    THE AT LEAST ONE EDGE DEVICE STORED │
│        IN THE AT LEAST ONE DATABASE    │
└─────────────────────────────────────┘
                  │
                  ▼
┌─────────────────────────────────────┐
│   PERFORM ONE OR MORE AUTOMATED ACTIONS │
│  BASED AT LEAST IN PART ON THE COMPARING │
│  OF THE ONE OR MORE RESPONSES WITH THE   │─── 408
│  AT LEAST A PORTION OF THE AT LEAST ONE  │
│          EVENT COMMUNICATION             │
└─────────────────────────────────────┘
```

AUTOMATICALLY DETERMINING AUTHENTICATED ONLINE STATUSES OF EDGE DEVICES

FIELD

The field relates generally to information processing systems, and more particularly to techniques for providing security in such systems.

BACKGROUND

Edge compute endpoints (ECEs) include devices such as servers, gateways, computers, etc. located where edge computing takes place. However, such endpoints can be associated with non-trusted network environments and/or lack guaranteed network connectivity. Conventional ECE management techniques include using a control plane to determine the online status of a device. Such techniques include monitoring device heartbeats or other signals at regular intervals (wherein a device is deemed to be offline when the control plane misses one or more heartbeats) and/or maintaining a list of devices connected to the control plane via a persistent connection (e.g., a websocket). However, such techniques are often error-prone and resource-intensive.

SUMMARY

Illustrative embodiments of the disclosure provide techniques for automatically determining authenticated online statuses of edge devices.

An exemplary computer-implemented method includes authenticating at least one connection of at least one edge device to at least one event bus by processing at least one event communication signed by the at least one edge device, and storing the at least one event communication signed by the at least one edge device in at least one database. The method also includes requesting online status of the at least one edge device by querying one or more application programming interfaces associated with the at least one event bus in accordance with one or more temporal parameters. Additionally, the method includes comparing one or more responses from the one or more application programming interfaces associated with the at least one event bus with at least a portion of the at least one event communication signed by the at least one edge device stored in the at least one database. Further, the method also includes performing one or more automated actions based at least in part on the comparing of the one or more responses with the at least a portion of the at least one event communication.

Illustrative embodiments can provide significant advantages relative to conventional ECE management techniques. For example, problems associated with error-prone and resource-intensive techniques are overcome in one or more embodiments through automatically determining authenticated online statuses of edge devices.

These and other illustrative embodiments described herein include, without limitation, methods, apparatus, systems, and computer program products comprising processor-readable storage media.

BRIEF DESCRIPTION OF THE DRAWINGS

FIG. 4 is a flow diagram of a process for automatically determining authenticated online statuses of edge devices in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
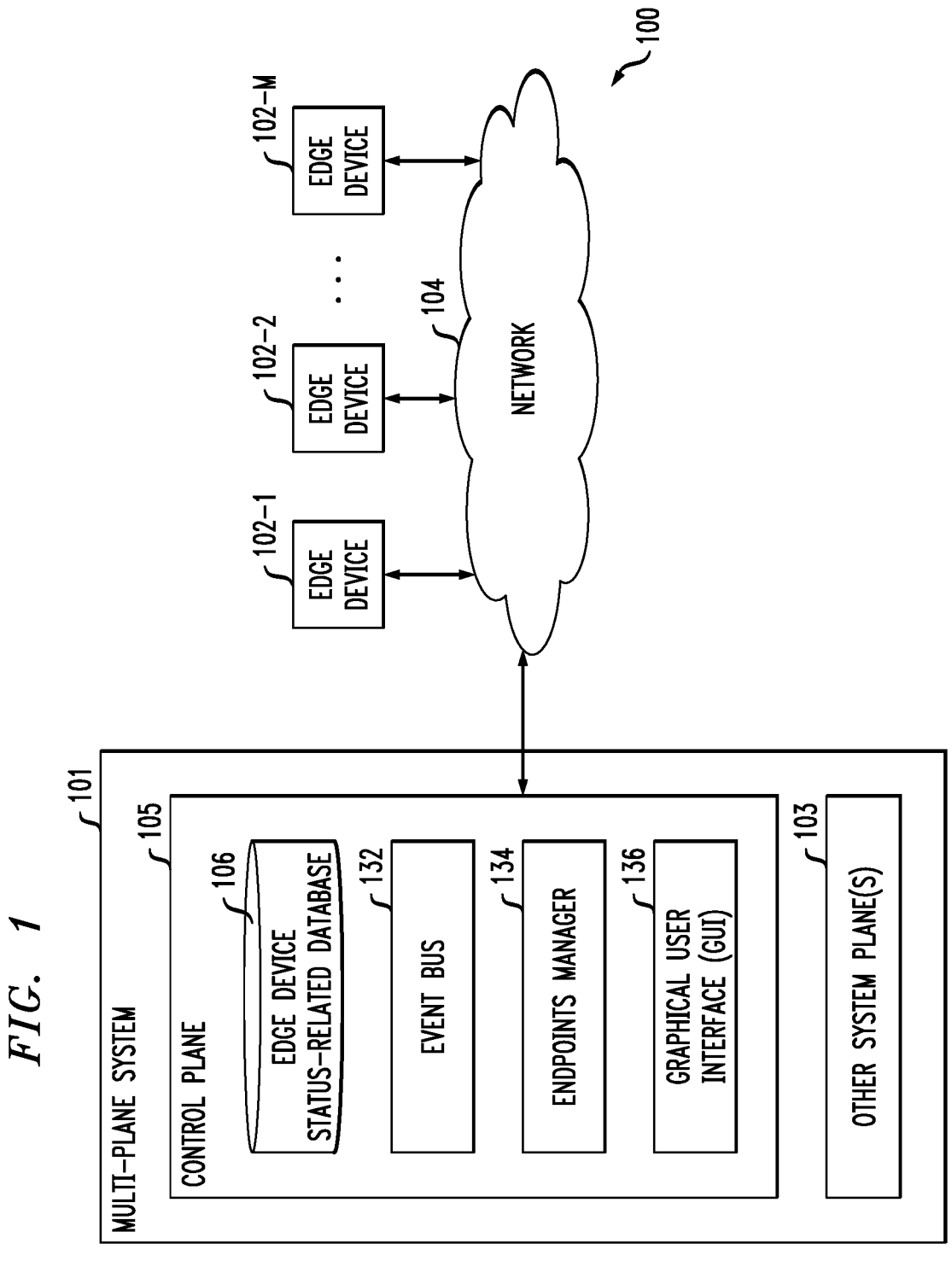
FIG. 1 shows an information processing system configured for automatically determining authenticated online statuses of edge devices in an illustrative embodiment.

FIG. 1 shows a computer network (also referred to herein as an information processing system) 100 configured in accordance with an illustrative embodiment. The computer network 100 comprises a plurality of edge devices 102-1, 102-2, . . . 102-M, collectively referred to herein as edge devices 102. The edge devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is multi-plane system 101, which includes control plane 105 and other system plane(s) 103.

The edge devices 102, which are also referred to herein as ECEs, may comprise, for example, mobile telephones, laptop computers, tablet computers, desktop computers or other types of computing devices and/or user devices. Such devices are examples of what are more generally referred to herein as "processing devices." Some of these processing devices are also generally referred to herein as "computers."

The edge devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network

100 in some embodiments therefore comprises combinations of multiple different types of networks, each comprising processing devices configured to communicate using internet protocol (IP) or other related communication protocols.

Additionally, control plane 105 can have an associated edge device status-related database 106 configured to store data pertaining to edge device status information, which comprise, for example, edge device agent information, edge device identifying information, edge device online status information, etc.

The edge device status-related database 106 in the present embodiment is implemented using one or more storage systems associated with control plane 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with control plane 105 are one or more input-output devices, which illustratively comprise keyboards, displays or other types of input-output devices in any combination. Such input-output devices can be used, for example, to support one or more user interfaces to control plane 105, as well as to support communication between control plane 105 and other related systems and devices not explicitly shown.

Additionally, control plane 105 in the FIG. 1 embodiment is assumed to be implemented using at least one processing device. Each such processing device generally comprises at least one processor and an associated memory, and implements one or more functional modules for controlling certain features of control plane 105.

More particularly, control plane 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows control plane 105 to communicate over the network 104 with the edge devices 102, and illustratively comprises one or more conventional transceivers.

The control plane 105 further comprises event bus 132, endpoints manager 134, and graphical user interface (GUI) 136.

It is to be appreciated that this particular arrangement of elements 132, 134 and 136 illustrated in control plane 105 of the FIG. 1 embodiment is presented by way of example only, and alternative arrangements can be used in other embodiments. For example, the functionality associated with elements 132, 134 and 136 in other embodiments can be combined into a single module, or separated across a larger number of modules. As another example, multiple distinct processors can be used to implement different ones of elements 132, 134 and 136 or portions thereof.

At least portions of elements 132, 134 and 136 may be implemented at least in part in the form of software that is stored in memory and executed by a processor.

It is to be understood that the particular set of elements shown in FIG. 1 for automatically determining authenticated online statuses of ECEs involving edge devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, control plane 105 and edge device status-related database 106 can be on and/or part of the same processing platform and/or different processing platforms.

An exemplary process utilizing elements 132, 134 and 136 of an example control plane 105 in computer network 100 will be described in more detail with reference to the flow diagram of FIG. 4.

Accordingly, at least one embodiment includes automatically determining authenticated online statuses of ECEs. Such an embodiment includes assuming that a given ECE is connected to at least one control plane with a transmission control protocol (TCP) connection when a corresponding network is available. As used herein, a control plane provides management and orchestration of edge devices. For example, a control plane can manage and orchestrate functionalities on edge devices such as, for example, managing a fleet of edge devices, configuring storage and network, retrieving hardware information, deploying software applications on edge devices, and managing the lifecycle of such applications, managing firmware and operating system upgrades of edge devices, managing security on edge devices, etc. Additionally, a control plane can determine the online status of edge devices such that the control plane can control when to send commands to the edge devices and when the control plane can request data from those edge devices.

As further detailed herein, one or more embodiments include addressing the zero-trust network security requirement of an edge device environment, which requires the control plane to attest the origin of the connection, while also addressing scalability issues, enabling at least one control plane (e.g., a single control plane) to efficiently manage a large number of ECEs.

Figure 2:
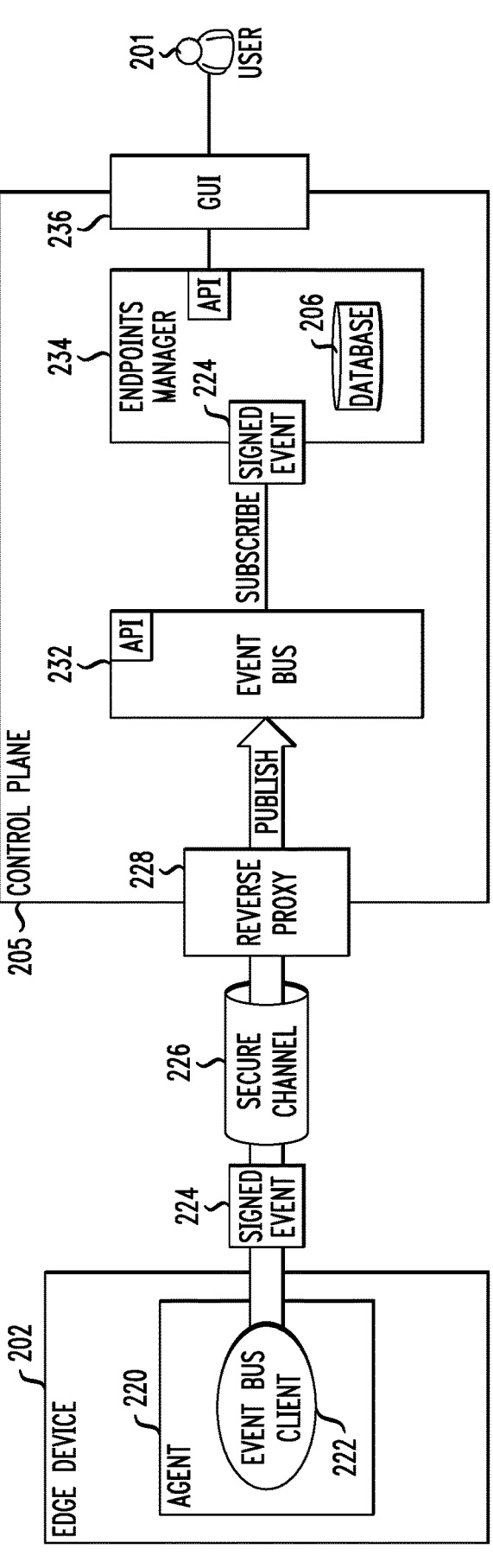
FIG. 2 shows an example architecture of an edge device and a control plane in an illustrative embodiment.

FIG. 2 shows an example architecture of an edge device and a control plane in an illustrative embodiment. By way of illustration, FIG. 2 depicts edge device 202 located at a far edge or near edge of a computing environment. Additionally, an edge device agent 220 running on the edge device 202 communicates with control plane 205 (located at and/or associated with a core and/or cloud) via at least one signed event 224 and therefore connects to an event bus client 222 (e.g., Kafka, neural autonomic transport system (NATS), and/or one or more other messaging system clients). In at least one embodiment (such as, e.g., depicted in FIG. 2), edge device agent 220 can generate an event and sign the event using its private key, before publishing the resulting signed event 224 to an event bus 232 of the control plane 205 to consume, as further described below. As used herein, an event sent from an ECE can include any event generated by a state change in the edge device, including hardware and software changes, completion of a process, alerts, etc. Additionally, for example, when the ECE is reconnected to a control plane, an event is sent to inform this state change (from disconnected to reconnected).

As also depicted in FIG. 2, a secure channel 226 between edge device 202 and control plane 205 can include, for example, one or more firewalls to block one or more most ports, one or more stateful inspection firewalls to prohibit non-hypertext transfer protocol (non-HTTP) traffic, etc. Also, in connection with one or more embodiments, edge device 202 is the initiator of all communications carried out using secure channel 226. Accordingly, edge device agent 220 communicates with control plane 205 through at least one signed event 224 sent over secure channel 226, which can include a secure websocket (WSS), hypertext transfer protocol secure (HTTPS), and/or mutual transport layer security (mTLS).

Also, in an embodiment such as depicted in FIG. 2, at the core or cloud: incoming connections to control plane 205 can terminate to a reverse proxy 228 (also referred to herein as an ingress controller). The reverse proxy 228 routes and/or proxies the secure channel (e.g., HTTP and/or websocket) connection directly to an event bus 232 (which can include at least one application programming interface (API)). In connection with control plane 205, one or more microservices can subscribe to the event bus 232 to receive events (such as, e.g., signed event 224) from the edge device 202. In the example embodiment depicted in FIG. 2, edge device 202 is managed by endpoints manager 234, which maintains a list of edge devices in edge device status-related database 206, wherein such a list includes information pertaining to the online status of each individual edge device. Endpoints manager 234 also provides one or more APIs for GUI 236. Additionally or alternatively, in one or more embodiments, such APIs can be used in connection with one or more command-line interfaces (CLIs). As also depicted in FIG. 2, a user 201 is able to query and view which edge devices (including, e.g., edge device 202) are online via the GUI 236.

Figure 3:
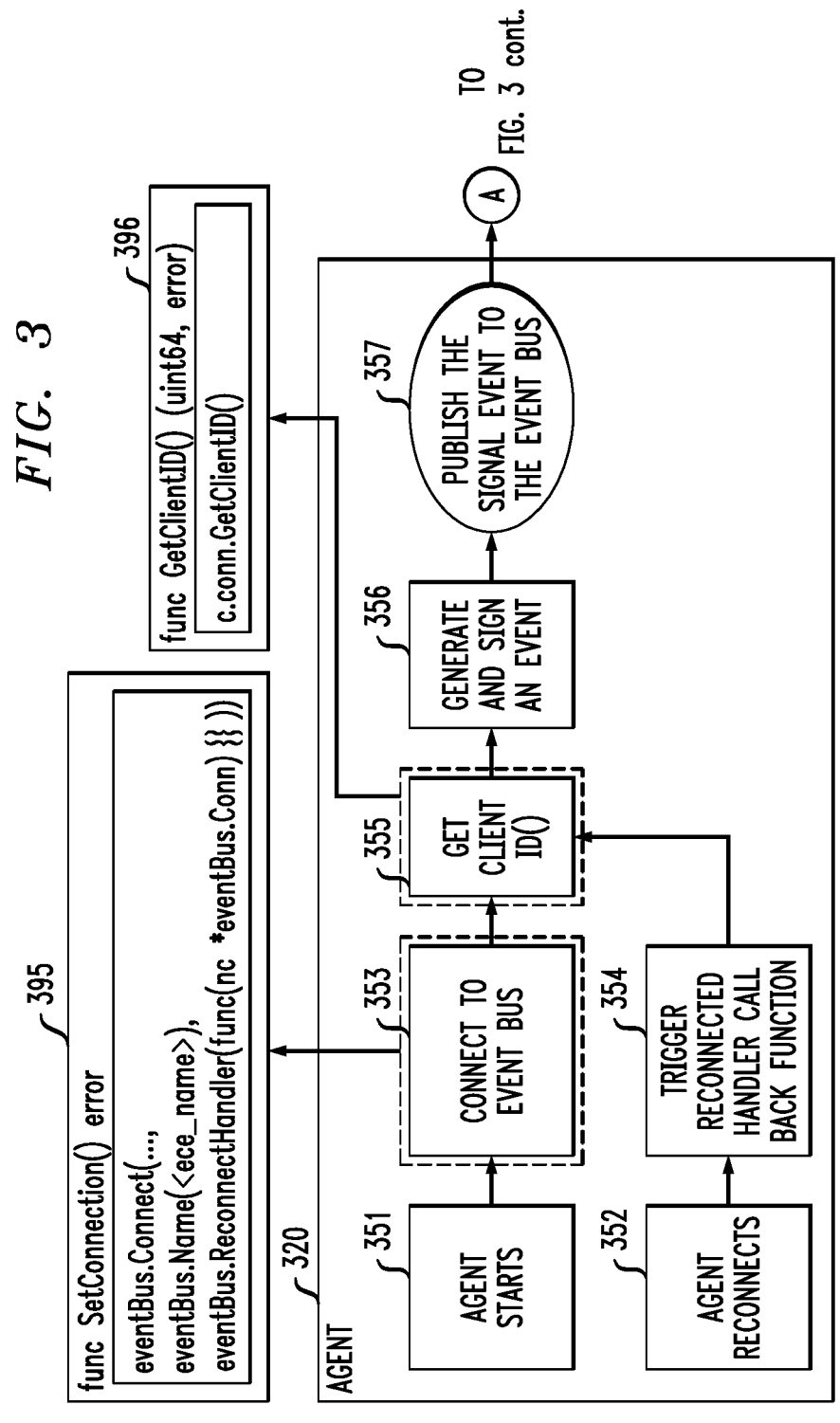
FIG. 3 shows an example workflows within an edge device and control plane environment in an illustrative embodiment.
Figure 3:
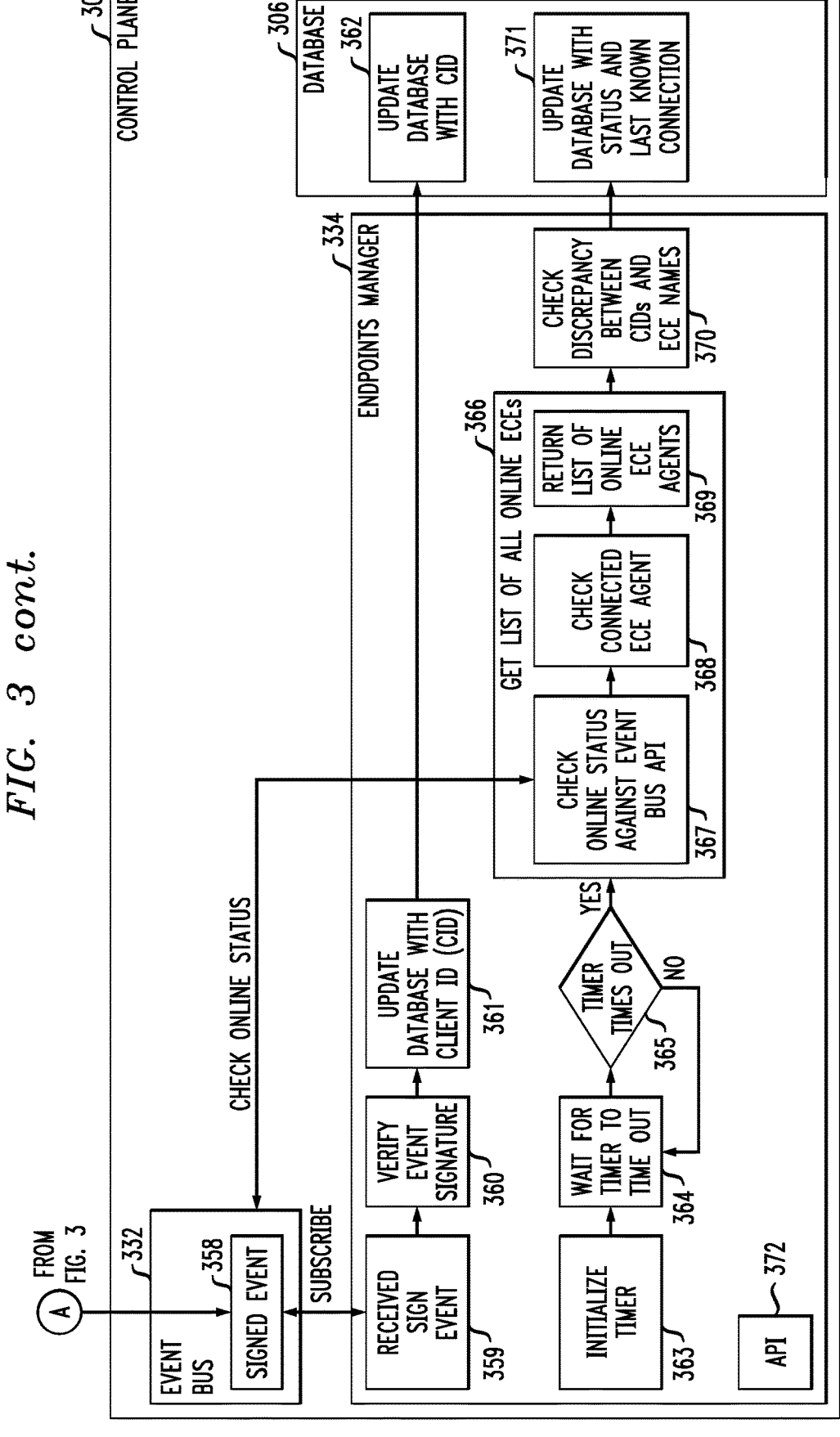

FIG. 3 shows an example workflows within an edge device and control plane environment in an illustrative embodiment. By way of illustration, FIG. 3 depicts one or more workflows being carried out across edge device agent 320 and control plane 305, which includes event bus 332, endpoints manager 334, and edge device status-related database 306. More specifically, when edge device agent 320 starts in step 351 or recovers from a lost connection in step 352, the edge device agent 320 connects to event bus 332 via step 353 (which can include, for example, implementing a function such as depicted via pseudocode 395, wherein the edge device agent 320 identifies itself using the edge device name as a connection parameter) or 354 (which can include, for example, triggering a reconnected handler call back function), respectively. Subsequent to connecting and/or re-connecting, the edge device agent 320 receives and/or obtains a unique client identifier (CID) assigned by event bus 332 in step 355 (which can include, for example, implementing a function such as depicted via pseudocode 396).

The edge device agent 320 then, in step 356, generates and signs a signed event 358, and subsequently publishes, in step 357, the signed event 358 to the control plane's event bus 332. Endpoints manager 334 subscribes to the event bus and receives, in step 359, the signed event 358. Then, in step 360, endpoints manager 334 verifies the event signature using the edge device's public key. If the event signature is valid, endpoints manager 334, in steps 361 and 362, saves the signed event and the edge device's CID into edge device status-related database 306. In one or more embodiments, the above-noted steps enable the endpoints manager 334 to authenticate the edge device's connection (using the edge device's CID in connection with the signed event 358) to the event bus 332. At this point, endpoints manager 334 can rely on one or more APIs of the event bus 332 to query the online status of the edge device. Without the above-noted process, the CID could, for example, be manipulated and/or fraudulently manifested, as the event bus connection parameters would not be signed.

Additionally, as also depicted in FIG. 3, endpoints manager 334 can carry out a workflow for monitoring the online status of the edge device (as well as one or more additional edge devices). For example, using an external timer (e.g., for stateless microservices) and/or an internal time (e.g., for stateful microservices), endpoints manager 334 calls one or more APIs of the event bus 332 every n seconds (wherein n is a configurable value). Depending on the event bus system type (e.g., NATS, Kafka, etc.) and scale, a single API call or multiple API calls may be required to obtain the status of all relevant edge devices. More specifically, in step 363, endpoints manager 334 initializes the timer (e.g., 30 seconds), then waits for the timer to time out in step 364. If the timer does not time out, as determined in connection with step 365, the workflow returns to step 364. If the time does time out, as determined in connection with step 365, the workflow proceeds to step 366 to obtain a list of all online edge devices, which includes steps 367, 368 and 369. Step 367 includes checking the online status of at least one given edge device against information obtained from one or more APIs of the event bus 332. Step 368 includes checking for the connected edge device agents using the name field (e.g., determining that the "name" in the database, as obtained from the signed event is the same as the "name" provided as part of the connection detailed by the events bus API), and step 369 includes returning a list of online edge device agents and comparing, in step 370, the list against information stored in edge device status-related database 306. Based at least in part on this comparison, the edge device status-related database 306 can be updated in step 371 in accordance with one or more noted discrepancies. As also depicted in FIG. 3, API 372 represents the external API provided by the endpoints manager 334 to one or more other services, which can include, for example, a GUI to query the online status of an ECE.

Accordingly, in one or more embodiments, endpoints manager 334 compares one or more event bus 332 API responses (which can include edge device agent names) with the endpoint manager's own edge device status-related database 306 record(s). If the API response(s) match(es) the database record(s), and if the online status for a given edge device has changed, endpoints manager 334 will update the database record accordingly. If the API response does not match the database record(s), an error will be logged and an security audit event can be generated. Such a security event can be investigated as a possibility of a security breach. Additionally, in such an embodiment, using a GUI (such as, for example, GUI 236 in FIG. 2), a user can see the online status for the given edge device change approximately in real-time (depending, e.g., on the above-noted endpoint manager timer's parameters).

Accordingly, and as detailed herein, one or more embodiments include combining at least one signed event mechanism with one or more event bus APIs to determine the online status of one or more edge devices (also referred to herein as ECEs). Such an embodiment includes facilitating a zero trust requirement of certain edge endpoint management techniques by authenticating the first event with a signature, and also facilitating scalability requirements associated with managing large number of edge devices (e.g., by relying on event bus APIs instead of publishing large amounts of heartbeats or other signals).

FIG. 4 is a flow diagram of a process for automatically determining authenticated online statuses of edge devices in an illustrative embodiment. It is to be understood that this particular process is only an example, and additional or alternative processes can be carried out in other embodiments.

In this embodiment, the process includes steps 400 through 408. These steps are assumed to be performed by control plane 105 utilizing elements 132, 134 and 136.

Step 400 includes authenticating at least one connection of at least one edge device to at least one event bus by processing at least one event communication signed by the at least one edge device. In at least one embodiment, the at least one event communication is signed by the at least one edge device using identifying information attributed to the at least one edge device, and wherein processing the at least one event communication signed by the at least one edge device includes processing the identifying information. Such an embodiment can also include assigning the identifying information to the at least one edge device. Additionally or alternatively, processing at least one event communication signed by the at least one edge device can include verifying, using at least one public key associated with the at least one edge device, the at least one event communication signed by the at least one edge device.

Step 402 includes storing the at least one event communication signed by the at least one edge device in at least one database. At least one embodiment can include storing the identifying information, used by the at least one edge device to sign the at least one event communication, in the at least one database in conjunction with the at least one event communication.

Step 404 includes requesting online status of the at least one edge device by querying one or more application programming interfaces associated with the at least one event bus in accordance with one or more temporal parameters. In one or more embodiments, querying one or more application programming interfaces associated with the at least one event bus in accordance with one or more temporal parameters includes using at least one external time in connection with one or more stateless microservices and/or using at least one internal time in connection with one or more stateful microservices.

Step 406 includes comparing one or more responses from the one or more application programming interfaces associated with the at least one event bus with at least a portion of the at least one event communication signed by the at least one edge device stored in the at least one database. In at least one embodiment, comparing one or more responses from the one or more application programming interfaces associated with the at least one event bus with at least a portion of the at least one event communication signed by the at least one edge device stored in the at least one database includes comparing identifying information contained in the one or more responses with the identifying information, used by the at least one edge device to sign the at least one event communication, stored in the at least one database.

Step 408 includes performing one or more automated actions based at least in part on the comparing of the one or more responses with the at least a portion of the at least one event communication. In one or more embodiments, performing one or more automated actions includes automatically updating the at least one database upon a determination, based at least in part on the comparing, that at least a portion of the one or more responses matches the at least a portion of the at least one event communication and that an online status of the at least one edge device has changed. Additionally or alternatively, performing one or more automated actions can include automatically displaying to at least one user, using at least one graphical user interface, online status information for the at least one edge device.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine authenticated online statuses of ECEs. These and other embodiments can effectively overcome problems associated with error-prone and resource-intensive techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figures 5, 6:
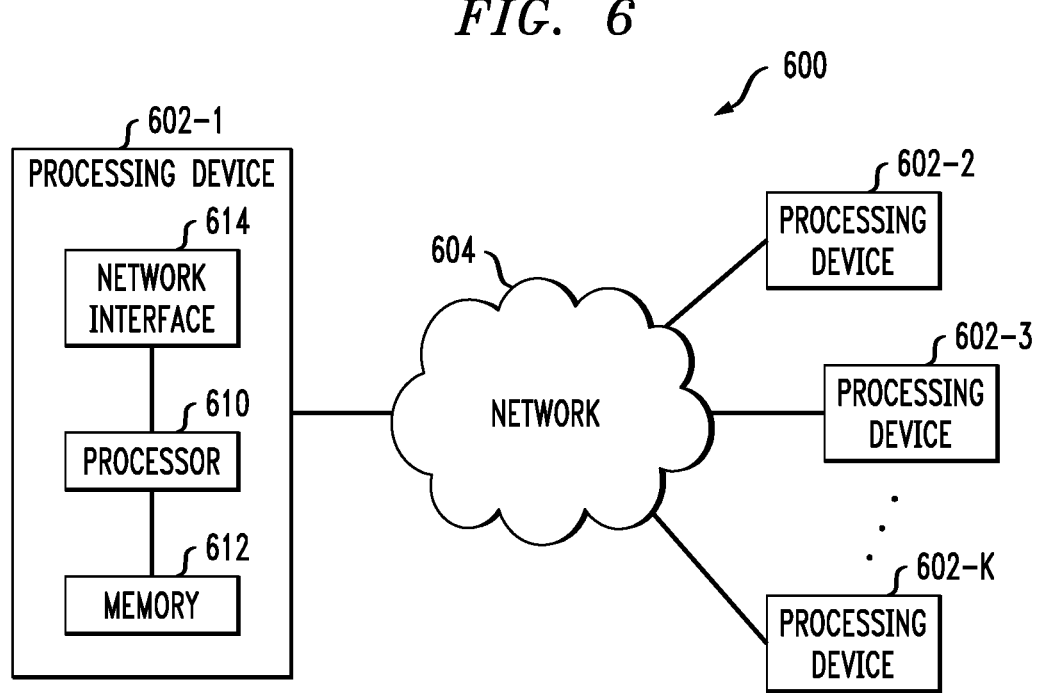
FIGS. 5 and 6 show examples of processing platforms that may be utilized to implement at least a portion of an information processing system in illustrative embodiments.

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   authenticating at least one connection of at least one edge device to at least one event bus by processing at least one event communication signed by the at least one edge device;
   storing the at least one event communication signed by the at least one edge device in at least one database;
   requesting online status of the at least one edge device by querying one or more application programming interfaces associated with the at least one event bus in accordance with one or more temporal parameters, wherein querying the one or more application programming interfaces comprises performing the querying at least in part utilizing (i) a first timer, external to the at least one edge device, of a first designated duration in connection with one or more stateless microservices and (ii) a second timer, internal to the at least one edge device, of a second designated duration, different than the first designated duration, in connection with one or more stateful microservices;

comparing one or more responses from the one or more application programming interfaces associated with the at least one event bus with at least a portion of the at least one event communication signed by the at least one edge device stored in the at least one database; and
   performing one or more automated actions based at least in part on the comparing of the one or more responses with the at least a portion of the at least one event communication;
   wherein the method is performed by at least one processing device comprising a processor coupled to a memory.

2. The computer-implemented method of claim 1, wherein the at least one event communication is signed by the at least one edge device using identifying information attributed to the at least one edge device, and wherein processing the at least one event communication signed by the at least one edge device comprises processing the identifying information.

3. The computer-implemented method of claim 2, further comprising:
   assigning the identifying information to the at least one edge device.

4. The computer-implemented method of claim 2, further comprising:
   storing the identifying information, used by the at least one edge device to sign the at least one event communication, in the at least one database in conjunction with the at least one event communication.

5. The computer-implemented method of claim 4, wherein comparing one or more responses from the one or more application programming interfaces associated with the at least one event bus with at least a portion of the at least one event communication signed by the at least one edge device stored in the at least one database comprises comparing identifying information contained in the one or more responses with the identifying information, used by the at least one edge device to sign the at least one event communication, stored in the at least one database.

6. The computer-implemented method of claim 1, wherein processing at least one event communication signed by the at least one edge device comprises verifying, using at least one public key associated with the at least one edge device, the at least one event communication signed by the at least one edge device.

7. The computer-implemented method of claim 1, wherein performing one or more automated actions comprises automatically updating the at least one database upon a determination, based at least in part on the comparing, that at least a portion of the one or more responses matches the at least a portion of the at least one event communication and that an online status of the at least one edge device has changed.

8. The computer-implemented method of claim 1, wherein performing one or more automated actions comprises automatically displaying to at least one user, using at least one graphical user interface, online status information for the at least one edge device.

9. A non-transitory processor-readable storage medium having stored therein program code of one or more software programs, wherein the program code when executed by at least one processing device causes the at least one processing device:
   to authenticate at least one connection of at least one edge device to at least one event bus by processing at least one event communication signed by the at least one edge device;

to store the at least one event communication signed by the at least one edge device in at least one database;

to request online status of the at least one edge device by querying one or more application programming interfaces associated with the at least one event bus in accordance with one or more temporal parameters, wherein querying the one or more application programming interfaces comprises performing the querying at least in part utilizing (i) a first timer, external to the at least one edge device, of a first designated duration in connection with one or more stateless microservices and (ii) a second timer, internal to the at least one edge device, of a second designated duration, different than the first designated duration, in connection with one or more stateful microservices;

to compare one or more responses from the one or more application programming interfaces associated with the at least one event bus with at least a portion of the at least one event communication signed by the at least one edge device stored in the at least one database; and to perform one or more automated actions based at least in part on the comparing of the one or more responses with the at least a portion of the at least one event communication.

10. The non-transitory processor-readable storage medium of claim 9, wherein the at least one event communication is signed by the at least one edge device using identifying information attributed to the at least one edge device, and wherein processing the at least one event communication signed by the at least one edge device comprises processing the identifying information.

11. The non-transitory processor-readable storage medium of claim 9, wherein processing at least one event communication signed by the at least one edge device comprises verifying, using at least one public key associated with the at least one edge device, the at least one event communication signed by the at least one edge device.

12. The non-transitory processor-readable storage medium of claim 9, wherein performing one or more automated actions comprises automatically updating the at least one database upon a determination, based at least in part on the comparing, that at least a portion of the one or more responses matches the at least a portion of the at least one event communication and that an online status of the at least one edge device has changed.

13. The non-transitory processor-readable storage medium of claim 9, wherein performing one or more automated actions comprises automatically displaying to at least one user, using at least one graphical user interface, online status information for the at least one edge device.

14. An apparatus comprising:

at least one processing device comprising a processor coupled to a memory;

the at least one processing device being configured:

to authenticate at least one connection of at least one edge device to at least one event bus by processing at least one event communication signed by the at least one edge device;

to store the at least one event communication signed by the at least one edge device in at least one database;

to request online status of the at least one edge device by querying one or more application programming interfaces associated with the at least one event bus in accordance with one or more temporal parameters, wherein querying the one or more application programming interfaces comprises performing the querying at least in part utilizing (i) a first timer, external to the at least one edge device, of a first designated duration in connection with one or more stateless microservices and (ii) a second timer, internal to the at least one edge device, of a second designated duration, different than the first designated duration, in connection with one or more stateful microservices;

to compare one or more responses from the one or more application programming interfaces associated with the at least one event bus with at least a portion of the at least one event communication signed by the at least one edge device stored in the at least one database; and to perform one or more automated actions based at least in part on the comparing of the one or more responses with the at least a portion of the at least one event communication.

15. The apparatus of claim 14, wherein the at least one event communication is signed by the at least one edge device using identifying information attributed to the at least one edge device, and wherein processing the at least one event communication signed by the at least one edge device comprises processing the identifying information.

16. The apparatus of claim 15, wherein the at least one processing device is further configured:

to store the identifying information, used by the at least one edge device to sign the at least one event communication, in the at least one database in conjunction with the at least one event communication.

17. The apparatus of claim 16, wherein comparing one or more responses from the one or more application programming interfaces associated with the at least one event bus with at least a portion of the at least one event communication signed by the at least one edge device stored in the at least one database comprises comparing identifying information contained in the one or more responses with the identifying information, used by the at least one edge device to sign the at least one event communication, stored in the at least one database.

18. The apparatus of claim 14, wherein processing at least one event communication signed by the at least one edge device comprises verifying, using at least one public key associated with the at least one edge device, the at least one event communication signed by the at least one edge device.

19. The apparatus of claim 14, wherein performing one or more automated actions comprises automatically updating the at least one database upon a determination, based at least in part on the comparing, that at least a portion of the one or more responses matches the at least a portion of the at least one event communication and that an online status of the at least one edge device has changed.

20. The apparatus of claim 14, wherein performing one or more automated actions comprises automatically displaying to at least one user, using at least one graphical user interface, online status information for the at least one edge device.

\* \* \* \* \*